Patented May 8, 1934

1,957,920

UNITED STATES PATENT OFFICE

1,957,920

MANUFACTURE OF 1-AMINO-4-HYDROXY-ANTHRAQUINONE

Myron S. Whelen, Milwaukee, Wis., assignor to E. I. du Pont de Nemours & Company, Wilmington, Del., a corporation of Delaware No Drawing. Application September 14, 1932, Serial No. 633,085

9 Claims. (Cl. 260—59)

This invention relates to the manufacture of organic compounds. More particularly it deals with the manufacture of 1-amino-4-hydroxy-anthraquinone.

It is an object of this invention to provide a simple and economical process for the manufacture of 1-amino-4-hydroxy-anthraquinone, in good yield and in a state of high purity.

Other and further important objects of this invention will appear as the description proceeds.

According to my invention, alpha-methoxy-anthraquinone is selected as initial material. This initial material is nitrated to produce 1-nitro-4-methoxy-anthraquinone. This intermediate in turn is reduced to give 1-amino-4-methoxy-anthraquinone. Finally, the last mentioned product is subjected to hydrolysis to give 1-amino-4-hydroxy-anthraquinone.

I have found that 1-amino-4-methoxy-anthraquinone can be readily hydrolyzed to produce 1-amino-4-hydroxy-anthraquinone. As hydrolyzing agent, any common agent generally used for hydrolyzing ethers may be employed. Concentrated sulfuric acid is the cheapest and most commonly used. Furthermore, when this agent is used, the final compound may be readily obtained from the reaction mass in a state of high purity by simply diluting the latter to a point where 1-amino-4-hydroxy-anthraquinone crystallizes out in the form of a sulfate, while the impurities stay in solution.

A sulfuric acid concentration of 70 to 80% appears to be the most favorable for separating the final product from its impurities. The hydrolysis, on the other hand, may be effected by the aid of sulfuric acid of any concentration from 70 to 100%. My process may therefore be worked by starting with concentrated sulfuric acid of say 93 to 98% strength and then diluting the reaction mass to a sulfuric acid concentration of about 75%. Or one may simply heat the 1-amino-4-methoxy-anthraquinone in sulfuric acid of 70 to 80% strength, whereupon hydrolysis and precipitation occur simultaneously.

For best results, the hydrolysis should be carried out at a temperature over 100° C., say between 100–150° C. Other temperatures, however, may be employed successfully. Thus, with 98% sulfuric acid, satisfactory results are obtained between 75 and 130° C.

The product thus obtained is characterized by high purity, as may be readily tested by converting it into a dyestuff. For instance, if the product is benzoylated to give 1-benzoylamino-4-hydroxy-anthraquinone, the latter dyestuff is obtained in the form of bronzy-red flakes. Less pure 1-amino-4-hydroxy-anthraquinone, when similarly benzoylated, leads to a violet-black powder.

Without limiting my invention to any particular procedure, the following examples are given for the purpose of illustration. Parts mentioned are by weight.

*Example 1.—1-nitro-4-methoxy-anthraquinone*

Ten (10) parts of 1-methoxy-anthraquinone are dissolved in sixty (60) parts of concentrated sulphuric acid (66° Bé.) at a temperature below 15° C., preferably in the presence of five (5) parts of boric acid. The reaction mass is cooled to 5° C., and nine and one-half (9.5) parts of a mixture of sulphuric and nitro acids, containing about 33% of nitric acid, are added, the temperature being maintained at or below 5° C. The reaction mass is now allowed to rise slowly to 25–35° C., and let stand for several hours. The nitro-methoxy-anthraquinone may now be isolated by drowning in cold water, filtering and washing acid free.

*Example 2.—1-amino-4-methoxy-anthraquinone*

Ten (10) parts of 1-nitro-4-methoxy-anthraquinone in the form of a wet cake as obtained, for instance, in Example 1, are suspended in three hundred (300) parts of water. To this suspension is added, at a temperature of 25–50° C., a solution containing about seventeen (17) parts of sodium sulphydrate (or sufficient sodium sulphydrate to completely reduce the initial material to 1 - amino - 4 - methoxy - anthraquinone). The mass is then heated at 70–100° C. for 2 hours, and the 1-amino-4-methoxy-anthraquinone produced is filtered off and washed.

*Example 3.—1-amino-4-hydroxy-anthraquinone*

Ten (10) parts of 1-amino-4-methoxy-anthraquinone (as obtained, for instance, in Example 2) are dissolved in sixty (60) parts of concentrated sulphuric acid (93%) and heated to 100–150° C. This temperature is maintained from 1 to 3 hours. The mixture is then cooled to 20–40° C., and water is added thereto until the concentration of the acid in the mixture has dropped to 70–80%. The mixture is cooled to 20–40° C., and filtered. The cake, which is the sulphate of 1-amino-4-hydroxy-anthraquinone, is washed with sulphuric acid of 70–80% strength, followed by washing with hot water until free of acid. This treatment transforms the sulphate into the free base.

The 1-amino-4-hydroxy-anthraquinone so formed is then dried.

*Example 4.—Alternative process of hydrolysis*

Ten (10) parts of 1-amino-4-methoxy-anthraquinone are dissolved in sixty (60) parts of 98% sulphuric acid and the mixture is heated to 75–130° C. for a period of 1 to 3 hours. The mixture is then cooled to 20–40° C. and water is added thereto until the acid in the mixture has reached 70 to 80%. The 1-amino-4-hydroxy-anthraquinone sulphate thus formed is filtered off and hydrolyzed by washing with hot water as in Example 1.

*Example 5.—Alternative process of hydrolysis*

Ten (10) parts of 1-amino-4-methoxy-anthraquinone are suspended in one hundred (100) parts of 75% sulphuric acid and the mixture is heated to 100 to 150° C. for a period of 1 to 3 hours. The reaction mixture is then cooled to 20–40° and filtered. The 1-amino-4-hydroxy-anthraquinone sulphate so formed is washed with hot water, as in the preceding examples, to give the free base.

It will be understood that many variations and modifications are possible in my preferred mode of operation, without departing from the spirit of this invention.

I claim:

1. A process for preparing 1-amino-4-hydroxy-anthraquinone, which comprises nitrating alpha-methoxy-anthraquinone to produce 1-nitro-4-methoxy-anthraquinone, reducing this compound to the corresponding amine, and hydrolyzing the amino-methoxy body.

2. A process for preparing 1-amino-4-hydroxy-anthraquinone, which comprises nitrating alpha-methoxy-anthraquinone to produce 1-nitro-4-methoxy-anthraquinone, reducing this compound by means of sodium sulphydrate to the corresponding amine, and hydrolyzing the latter body by means of sulfuric acid.

3. A process for preparing 1-amino-4-hydroxy-anthraquinone, which comprises nitrating alpha-methoxy-anthraquinone to produce 1-nitro-4-methoxy-anthraquinone, reacting upon this compound with sodium sulphydrate to produce 1-amino-4-methoxy-anthraquinone, reacting upon the latter body with concentrated sulfuric acid to produce 1-amino-4-hydroxy-anthraquinone, recovering the latter body in the form of its sulfate, and washing the latter with hot water to give the free base.

4. In the process of producing 1-amino-4-hydroxy-anthraquinone, the step which comprises hydrolyzing 1-amino-4-methoxy-anthraquinone.

5. In the process of producing 1-amino-4-hydroxy-anthraquinone, the step which comprises hydrolyzing 1-amino-4-methoxy-anthraquinone by means of concentrated sulfuric acid to split off the methyl group.

6. In the process of producing 1-amino-4-hydroxy-anthraquinone, the step which comprises heating 1-amino-4-methoxy-anthraquinone in concentrated sulfuric acid to produce 1-amino-4-hydroxy-anthraquinone sulfate, recovering the latter body and reacting upon the same with hot water to produce the free base.

7. In the process of producing 1-amino-4-hydroxy-anthraquinone, the step which comprises heating 1-amino-4-methoxy-anthraquinone in concentrated sulfuric acid to split off the methyl group, and diluting the mass in water to precipitate the sulphate of 1-amino-4-hydroxy-anthraquinone.

8. The process of preparing 1-amino-4-hydroxy-anthraquinone, which comprises heating 1-amino-4-methoxy-anthraquinone in sulfuric acid of 93 to 98% concentration, at a temperature of 75 to 150° C., until the methoxy group has been hydrolyzed to a hydroxy group, diluting the reaction mass to a sulfuric acid concentration of about 70–80%, and recovering the precipitated sulfate of 1-amino-4-hydroxy-anthraquinone.

9. The process of preparing 1-amino-4-hydroxy-anthraquinone which comprises heating 1-amino-4-methoxy-anthraquinone in sulfuric acid of 93 to 98% concentration, at a temperature of 75 to 150° C., until the methoxy group has been hydrolyzed to a hydroxy group, diluting the reaction mass to a sulfuric acid concentration of about 70–80%, recovering the precipitated sulfate of 1-amino-4-hydroxy-anthraquinone, and reacting upon the latter with hot water to convert it to the free base.

MYRON S. WHELEN.